United States Patent

[11] 3,633,629

| [72] | Inventor | Thomas F. Rider |
| | | Manitowoc, Wis. |
| [21] | Appl. No. | 814,903 |
| [22] | Filed | Apr. 10, 1969 |
| [45] | Patented | Jan. 11, 1972 |
| [73] | Assignee | I-T-E Imperial Corporation |

[54] HOSE CONSTRUCTION AND METHOD FOR FORMING THE SAME
21 Claims, 6 Drawing Figs.

[52] U.S. Cl. .................................................. 138/127,
57/140 BY, 87/6, 156/149, 156/172, 161/91
[51] Int. Cl. .................................................. F16l 11/02
[50] Field of Search .......................................... 138/124,
125, 126, 127; 156/149, 172; 161/91; 87/1, 6;
57/140 BY; 66/9 A, 202, 169

[56] References Cited
UNITED STATES PATENTS

| 2,788,804 | 4/1957 | Larkin | 138/125 |
| 2,828,776 | 4/1958 | Meyer | 161/91 X |
| 2,833,313 | 5/1958 | Penman | 138/125 |
| 2,030,160 | 2/1936 | Titcomb | 87/6 X |
| 3,226,275 | 12/1965 | Keiss | 156/306 |
| 3,479,670 | 11/1969 | Medell | 3/1 |
| 3,524,542 | 8/1970 | Chlystum | 57/140 BY X |

*Primary Examiner*—Carlton R. Croyle
*Assistant Examiner*—Richard J. Sher
*Attorney*—Hofgren, Wegner, Allen, Stellman & McCord ABSTRACT: A hose construction and method of forming the hose construction wherein a reinforcing means is provided about a tubular core. The reinforcing means includes a first portion which is bondable with the core and a second portion which remains free for movement relative to the core subsequent to the bonding of the first portion to the core. The first portion of the reinforcing means and the core may be formed of a thermoplastic material whereby the bonding is obtained by heat fusion. A sheath may be provided about the reinforced core and a portion of the reinforcing means may be bonded to the sheath. The sheath may be formed of a thermoplastic material and may be bonded to the reinforcing means portion by heat fusion.

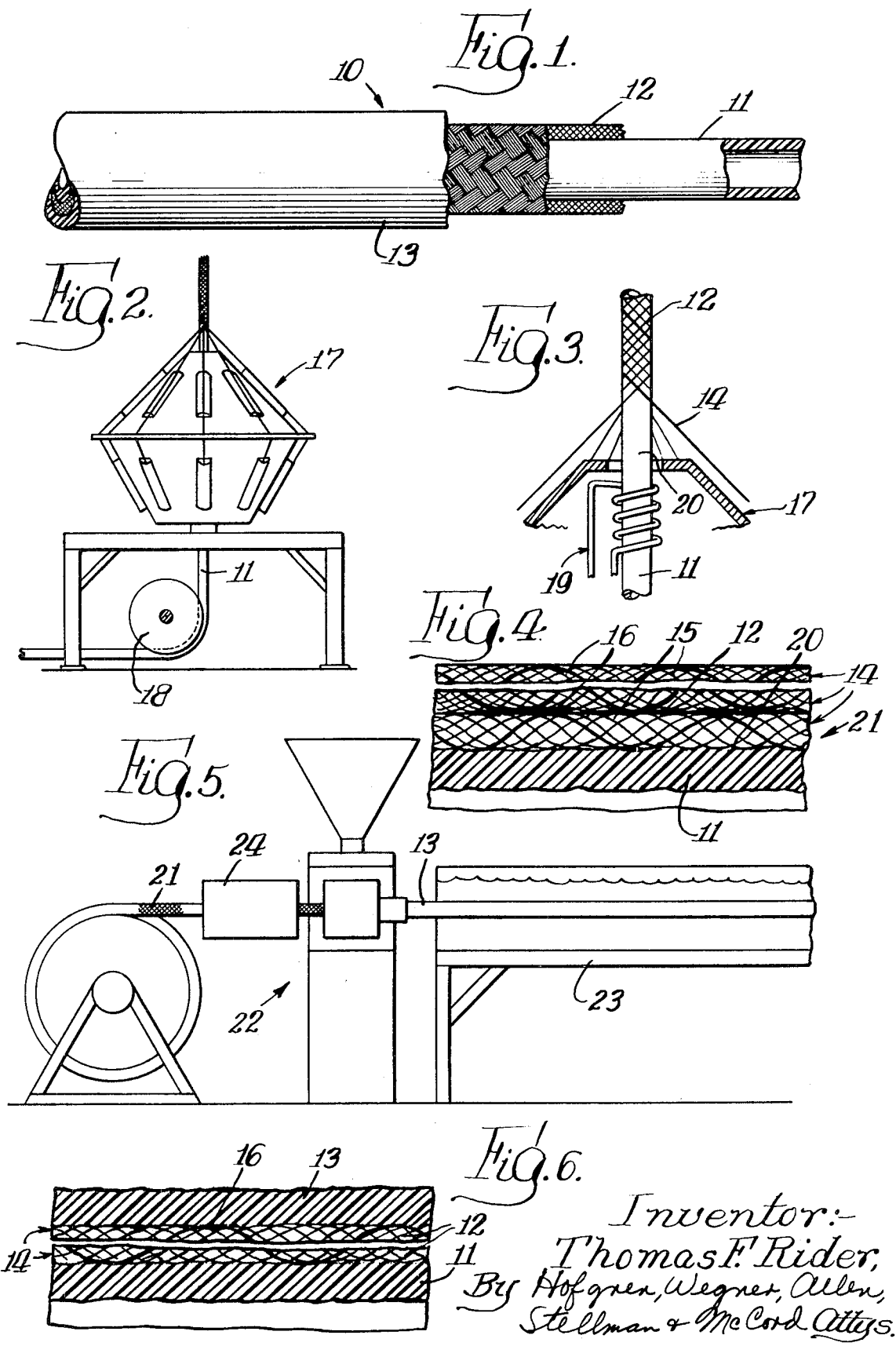

HOSE CONSTRUCTION AND METHOD FOR FORMING THE SAME

BACKGROUND OF THE INVENTION

1. Field of the Invention

This invention relates to hose constructions and methods of forming the same.

2. Description of the Prior Art

In one form of hose construction, a reinforcing means is provided on a tubular core. Illustratively, the reinforcing means may comprise a braided, spiral wrapped, or knitted material formed of a plurality of fibers, or filaments. It has been found desirable to bond the reinforcing means to the core. Such bonding has been conventionally effected by mechanical interlocking, such as by forcibly urging the reinforcing fibers into the outer surface of the core. Alternatively, adhesives have been employed for bonding the reinforcing means to the core. Further alternatively, where the core and reinforcing means are formed of suitable plastic materials, the reinforcing means has been bonded to the core by solvent welding. The bonding methods heretofore employed have had serious deficiencies in being relatively expensive and not providing the desired degree of flexibility, kink resistance, strength, and other desirable hose characteristics. Further, in the adhesive and solvent welding methods, fume toxicity has presented a serious manufacturing problem. Particularly where the bonding is effected by solvent welding, reinforcing strength has been decreased. Further, in the known bonding processes, because accuracy in the control of the bonding is difficult, variations in the bonding at different portions of the hose construction often result.

SUMMARY OF THE INVENTION

The present invention comprehends an improved hose construction and method for forming the same which eliminates the above discussed disadvantages of the prior art hose constructions and methods of forming hose constructions in a novel and inexpensive simple manner.

The present invention comprehends a hose construction wherein the reinforcing means includes one portion which is bonded to the core and a second portion which remains free for movement relative to the core. In the illustrated embodiment, the reinforcing means comprises a braid wherein a portion of the braid fibers are thermoplastic fibers for heat fusion bonding with a thermoplastic core. The remaining fibers are selected to remain free of bonding to the core, and thus, may have free movement relative to the core.

The second portion of the reinforcing means may comprise thermoplastic means having a melt point which is higher than the melt point of the first portion. Alternatively, the second portion may comprise any other suitable reinforcing fiber, or filament, as desired, which will remain unbonded to the core subsequent to the bonding of the first portion to the core.

The hose construction may further include an outer sheath which may be bonded to the reinforcing means as by being bonded to one of the portions of the reinforcing means while allowing the other portion of the reinforcing means to remain free for movement relative to the sheath. Thus, the sheath may be formed of a thermoplastic material which may be heat fused to a thermoplastic portion of the reinforcing means.

Thus, the invention comprehends the provision of a reinforcing means which is a binary system wherein one portion only is bonded to the core and one portion is bonded to the sheath when a sheath is provided in the hose construction, and a second portion formed of a material differing from that of the first portion remains unbonded and thereby is movable relative to the core and sheath to provide improved flex and strength characteristics.

The hose construction may be formed by applying the reinforcing means onto a suitably heated core having a surface temperature sufficient to permit heat fusion of the thermoplastic portion of the reinforcing means thereto. Where a sheath is applied, the sheath may be extruded onto the reinforced core carcass with the heat energy of the extruded sheath material providing a portion of the heat energy for heat bonding the reinforcing means portion to the sheath. The contraction of the sheath upon cooling cooperates with the fluid pressure of the extrusion of the sheath material onto the reinforcing means to assure a positive bond between the sheath and reinforcing means bonding portion.

BRIEF DESCRIPTION OF THE DRAWING

Other features and advantages of the invention will be apparent from the following description taken in connection with the accompanying drawings wherein:

FIG. 1 is a fragmentary side elevation of a hose construction embodying the invention with portion broken away to illustrate the several layers thereof;

FIG. 2 is a side elevation of an apparatus for applying the reinforcing means to the core;

FIG. 3 is a fragmentary vertical diametric section of a portion of the structure of FIG. 2;

FIG. 4 is a fragmentary diametric section of the reinforced core carcass wherein the reinforcing means is secured to the core;

FIG. 5 is a fragmentary side elevation of an apparatus for applying a sheath to the carcass; and FIG. 6 is a fragmentary enlarged diametric section of the hose construction.

DESCRIPTION OF THE PREFERRED EMBODIMENTS

In the exemplary embodiment of the invention as disclosed in the drawing, a hose construction generally designated 10 is shown to comprise a reinforced host having a tubular core 11, a reinforcing means 12, and an outer sheath 13. The reinforcing means illustratively comprises a fibrous, or filamentary, material effectively wrapped about the core to provide improved reinforcement of the core against fluid pressures and the like. The reinforcing means may comprise any suitable construction geometry, such as braided, spiral wrapped, knitted, woven, etc., constructions suitable to provide a flexible, high strength reinforcement of the core. In the illustrated embodiment, the reinforcing means 12 comprises a braid reinforcement.

The invention comprehends the forming of the reinforcing means to have a plurality of distributed portions with at least one portion being bonded to the core and at least one other portion being free for movement relative to the core in the hose construction 10. Thus, in the illustrated embodiment, reinforcing means 12 comprises a braided, preplied yarn 14 including a first portion defining reinforcing yarn 15, and a second portion defining fusion yarn 16. Yarn 14 is applied in the form of a braid wrapped under tension onto the core 11. The yarns 15 and 16 are preferably formed of different materials to provide for the selective bonded and unbonded relationship thereof to the core. It is preferable that the filamentary components of the yarn 14 be relatively small so as to provide a large multiplicity of contacts between the yarn 14 and the outer core surface 10. Thus, illustratively, it has been found desirable to utilize components of yarn 14 having diameters of approximately under 10 mils.

Illustratively, the core may be formed of a thermoplastic material. The fusion yarn 16 may be formed of a thermoplastic compatible with the thermoplastic core to permit thermal fusion bonding therebetween. If desired, fusion yarn 16 may be formed of a thermoplastic material similar to that of the core 11. Alternatively, the fusion yarn 16 may be formed of a thermoplastic material different from that of the core but selectively bondable with the core while yet permitting the reinforcing yarn 15 to remain unbonded to the core 11.

The reinforcing yarn 15 may comprise a thermoplastic material having a melt point substantially higher than the melt point of thermoplastic fusion yarn 16 to permit the desired bonded and unbonded association of the reinforcing means yarns relative to the core. Other examples of suitable reinforcement yarns 15 comprise glass, metal, animal or vegetable fiber yarns, thermoset plastics, such as polyesters and rayon, and other suitable plastic fibers which will not fusion bond to the core at the temperature of fusion of the fusion yarn 16 thereto.

The core 11 may be formed of olefin, elastomeric, vinyl, polyamide, ethylene copolymer, and the like, thermoplastic materials. It is preferable that the plastic materials have a relatively low filler content to assure good adhesion between fusion yarn 16 and the core.

As shown in FIG. 2, the core 11 may be delivered upwardly through a braiding apparatus generally designated 17 by suitable feed means 18. Apparatus 17 may include a heating coil 19 which raises the temperature of the surface 20 of the core 11 to fusion temperature immediately before the preplied yarn 14 is braided under tension thereonto, as best seen in FIG. 3. To maintain internal stability of the core 11, a coolant fluid, such as water, may be circulated through the tube during the application of the braid to the heat softened surface 20.

As shown in FIG. 4, the braid reinforcing means 12 of the reinforced carcass 21 is defined by one portion made up of reinforcing yarn 15 free to move relative to the surface 20 of the core 11 and portion 16 made up of the fusion yarn heat fused to the surface 20 to provide a positive bonded association between the reinforcing means portion 16 and the core 11.

In one example of such a hose construction, the yarn 14 comprises a 4,200 denier, multifilament nylon yarn 15 having a melting point of approximately 550° F. and the fusion yarn 16 comprises four strands of 0.008 inch diameter polyethylene yarn having a melting point of approximately 240° to 250°F. The surface 20 of the core 11 is raised to a temperature of at least 250° to provide the desired heat fusion bonding of the yarn 16 thereto.

Another example of hose construction 10 embodying the invention illustratively comprises a core formed of nylon copolymer having an inside diameter of approximately 0.5 inch and a wall thickness of 0.075 inch. The reinforcing yarn 14 comprises a yarn formed of 140 filaments of nylon 66, 4,200 denier yarn, and four filaments of 8 mil polyethylene. The core may be formed of a suitable thermoplastic having a melt point of approximately of 240° to 250° F.

Thus, the invention broadly comprehends the use of a multiple yarn system in the reinforcing braid 12 with only a portion thereof being bonded to the core 11. As will be obvious to those skilled in the art, the selective bonding of one portion of the reinforcing yarn and nonbonding of another portion thereof may be effected not only by selective thermoplastic fusion bonding, but may also be effected by other suitable selective bonding means, such as adhesive systems, bonding only one of the different fiber materials to the braid while allowing the other to remain unbonded.

As discussed above, the hose construction 10 may include an outer sheath 13 overlying the braid 12. As shown in FIG. 5, the sheath 13 may be provided on the reinforced carcass 21 by passing the carcass through an extruder 22. The carcass 21 may be stored in the form of coils and fed through the extruder in the conventional manner. The extruded sheath may be suitably quenched in a tank 23. The carcass may be heated prior to the passage thereof through the extruder 22 by means of a suitable preheater 24 which raises the temperature of the outer fusion yarn surfaces to approximately the softening temperature. The thermoplastic sheath material is extruded under pressure onto the carcass to form an outer protective covering, or sheath 13, as shown in FIG. 6. A portion of the heat energy effecting the fusion of the fusion yarn 16 to the sheath 13 may be obtained from the heat content of the extruded material.

Illustratively, the sheath may be formed of polyethylene having a thickness of approximately 0.01 inch. The sheath material may be suitably pigmented as desired as for improved resistance to ultraviolet radiation, etc. The sheath material preferably comprises a thermoplastic. Other examples of suitable thermoplastics are olefin, elastomers, vinyls, polyamides, ethylene copolymers, etc.

As discussed above relative to the core, the invention comprehends broadly the bonding of the sheath to a portion of the reinforcing means while allowing another portion of the reinforcing means to be free for movement relative to the sheath. In the illustrated embodiment, the bonding is effected by thermoplastic fusion between the one portion of the reinforcing means and the sheath. As will be obvious to those skilled in the art, other methods of selectively bonding one portion of the reinforcing means to the sheath while allowing the remaining reinforcing means to have free movement relative to the sheath may be employed within the scope of the invention. Illustratively, selective adhesive means for bonding only the desired one portion of the reinforcing means to the sheath while allowing the remainder of the reinforcing means to remain unbonded may be employed.

The foregoing disclosure of specific embodiments is illustrative of the broad inventive concepts comprehended by the invention.

I claim:

1. A hose construction comprising: a tubular core formed of a first, fluid conducting material; and reinforcing means extending under tension about said core and having intermixed first and second portions contacting the outer surface of said tubular core, said first portion being formed of a second, fibrous material and said second portion being formed of a third, fibrous material, substantially all of said first portion of said fibers contacting said core being substantially permanently bonded to said core and substantially all of said second portion of said fibers contacting said core being free for movement relative to said core.

2. The hose construction of claim 1 wherein said core and first reinforcing means portion are formed of the same material.

3. The hose construction of claim 1 wherein each of said first and second materials comprises a thermoplastic material.

4. The hose construction of claim 1 wherein said first and second materials comprise nylon.

5. The hose construction of claim 1 wherein said third material comprises a thermoplastic material.

6. The hose construction of claim 1 wherein said third material comprises a thermoset plastic material.

7. The hose construction of claim 1 wherein said third material comprises a glass material.

8. The hose construction of claim 1 wherein said third material comprises a metallic material.

9. The hose construction of claim 1 wherein said third material comprises an organic fiber material.

10. The hose construction of claim 1 further including an outer sheath extending about said reinforcing means.

11. The hose construction of claim 1 wherein each of said reinforcing means portions comprises thermoplastic means, said first portion thereof comprising thermoplastic means having a melt point which is lower than that of the melt point of the second portion.

12. The hose construction of claim 1 wherein each of said reinforcing means portions comprises a yarn.

13. The hose construction of claim 1 wherein said reinforcing means first portion comprises a yarn formed of fiber having a diameter of under 10 mils.

14. A hose construction comprising: a tubular core formed of a first, fluid conducting material; and reinforcing means comprising a braid wrapped under tension about said core and having intermixed first and second portions contacting the outer surface of said tubular core, said first portion being formed of a second, fibrous material and said second portion being formed of a third, fibrous material, substantially all of said first portion of said fibers contacting said core being substantially permanently bonded to said core and substantially all of said second portion of said fibers contacting said core being free for movement relative to said core.

15. A hose construction comprising: a tubular core formed of a first, fluid conducting material; reinforcing means extending under tension about said core and having intermixed first and second portions contacting the outer surface of said core, said first portion being formed of a second, fibrous material and said second portion being formed of a third, fibrous material, and an outer sheath extending about said reinforcing means and formed of a fourth, covering material, substantially all of said first portion of said fibers contacting said sheath being substantially permanently bonded to said sheath and substantially all of said second portion of said fibers contacting said sheath being free for movement relative to said sheath.

16. The hose construction of claim 15 wherein one portion of the reinforcing means is bonded to the core and another portion of the reinforcing means is free for movement relative to said core.

17. The hose construction of claim 15 wherein said one portion of the reinforcing means comprises a thermoplastic material and said outer sheath comprises a thermoplastic material heat fusible with said one portion, said outer sheath being heat fused to said one portion.

18. The hose construction of claim 15 wherein each of said one portion of the reinforcing means and said sheath is formed of the same thermoplastic material.

19. The hose construction of claim 15 wherein said sheath comprises a tubular thermoplastic extrusion.

20. The hose construction of claim 15 wherein said one portion of said reinforcing means is formed of a thermoplastic material, said sheath comprising thermoplastic material extruded onto said reinforcing means, the heat of the extruded sheath material at least partially effecting a fusion bond of said sheath to said one portion of the reinforcing means.

21. The hose construction of claim 15 wherein said core and first portion of the reinforcing means comprise thermoplastic materials, said reinforcing means comprising a braid wound under tension onto said core while said core is at fusion temperature of said material.

* * * * *